United States Patent [19]
DeRees

[11] Patent Number: 5,618,603
[45] Date of Patent: Apr. 8, 1997

[54] FIBER REINFORCEMENT MAT FOR COMPOSITE STRUCTURES

[75] Inventor: Delbert D. DeRees, Romeo, Mich.

[73] Assignee: Chrysler Corporation, Auburn Hills, Mich.

[21] Appl. No.: 637,025

[22] Filed: Apr. 24, 1996

Related U.S. Application Data

[62] Division of Ser. No. 356,070, Dec. 14, 1995.

[51] Int. Cl.$^6$ .......................................................... D03D 3/00
[52] U.S. Cl. .......................... 428/66.6; 428/37; 428/64.1; 428/66.2; 428/66.1; 428/66.4
[58] Field of Search ........................... 428/37, 64.1, 66.2, 428/66.7, 225, 66.1, 66.4; 139/459, 384 R

[56] References Cited

U.S. PATENT DOCUMENTS

| | | | |
|---|---|---|---|
| 2,113,261 | 4/1938 | Walters | 192/107 |
| 3,639,197 | 2/1972 | Spain | 161/35 |
| 3,759,353 | 9/1973 | Marin | 188/71.5 |
| 3,936,552 | 3/1976 | Krupp et al. | 428/64 |
| 4,002,225 | 1/1977 | Marin | 188/73.2 |
| 4,063,684 | 12/1977 | O'Brien et al. | 239/265.11 |
| 4,244,585 | 1/1981 | Croll | 273/408 |
| 4,542,056 | 9/1985 | Anglin et al. | 428/116 |
| 4,697,324 | 10/1987 | Grant et al. | 29/419 |
| 4,725,485 | 2/1988 | Hirokawa | 428/225 |
| 5,242,745 | 9/1993 | Aucagne et al. | 428/225 |

FOREIGN PATENT DOCUMENTS 1319574  1/1963  France .

OTHER PUBLICATIONS

Fairchild's Dictionary of Textiles, ed. by Wingate, New York University. Fairchild Publications, Inc, N.Y. 1959, p. 631.
Fairchild's Dictionary of Textiles; Ed. Wingate; Fairchild Publications, Inc. New York; 1959; pp. 227, 228, 631 & 637.

Primary Examiner—Kathleen Choi
Attorney, Agent, or Firm—Christopher A. Taravella

[57] ABSTRACT

A fiber reinforcing mat is used proximate a through hole in an automotive structural element in order to reinforce the element in the area approximate the through hole. The fiber reinforcing mat is comprised of a warp having a plurality of radially extending loops and a weft which is woven through the loops in a spiral fashion. Since the weft is configured as a spiral, weft material is more dense in the area close to the through hole than in the area distal of the through hole. Consequently, the stiffness of the structural element decreases gradually in radial directions away from the through hole.

4 Claims, 2 Drawing Sheets

FIBER REINFORCEMENT MAT FOR COMPOSITE STRUCTURES

FIELD OF THE INVENTION

This application is a divisional of Application Ser. No. 08/356,070 filed Dec. 14, 1995, now allowed.

The present invention relates to a fiber reinforcement mat for composite structures. More particularly, the present invention relates to fiber reinforcement mats for composite structures wherein the reinforcement mats are utilized around discontinuities, such as through holes, in the structures.

BACKGROUND OF THE INVENTION

In the automotive industry, vehicles are configured of structural elements such as struts, beams and panels. Traditionally, these structural elements have been made of metal, but lately use has been made of resin-type materials which are frequently reinforced with fiber depending on the use to which the structural element is put. Structural elements are joined to one another by bolts, rivets or screws which pass through holes in the structural elements. Areas of the structural elements proximate the holes are subject to stress and fatigue which over time can cause cracks and perhaps eventual failure of the structural element.

In order to remain competitive in the automotive industry, it is very important to keep costs as low as possible. This can be accomplished by reducing the amount of material for making a particular component, such as a panel, and by simplifying the fabrication process. It is possible to produce thinner panels which use less material and perhaps less reinforcement by only reinforcing the panels where necessary. For example, if panels are only reinforced proximate through holes, or even only heavily reinforced proximate through holes, then the overall thickness of a panel can be reduced so as to use less material.

In addition to reducing costs less material reduces the weight of a component, such as a panel. Weight reduction has the advantage of reducing fuel consumption and the amount of material which must be disposed of or recycled once the vehicle is no longer in service.

In the automotive industry, very slight savings and expense and weight can become very important when one considers that there are tens of millions of vehicles manufactured and in service. Accordingly, incremental improvements which may appear to be relatively modest assume enormous importance when combined with numerous other incremental improvements which reduce costs and vehicle weight.

SUMMARY OF THE INVENTION

It is a feature of the present invention to provide a new and improved structure for reinforcing discontinuities in structural elements such as composite panels, struts, blocks, beams and the like.

The present invention is directed to a fiber mat for reinforcing a structural member proximate a location of high stress in the structural member. The fiber mat has a central opening therethrough with warp material projecting radially from the central opening. Weft material is woven through the warp material at a higher concentration proximate the central opening than distant from the central opening to provide a gradual reduction in density of weft material in the radial direction away from the central opening.

In another aspect, the present invention is directed to a combination of a structural member having fiber reinforcement, the fiber reinforcement being configured as a mat having warp material extending radially from the discontinuity. Weft material is woven through the warp material, the weft material being more densely concentrated proximate the discontinuity than distally of the discontinuity.

DETAILED DESCRIPTION

Figure 1:
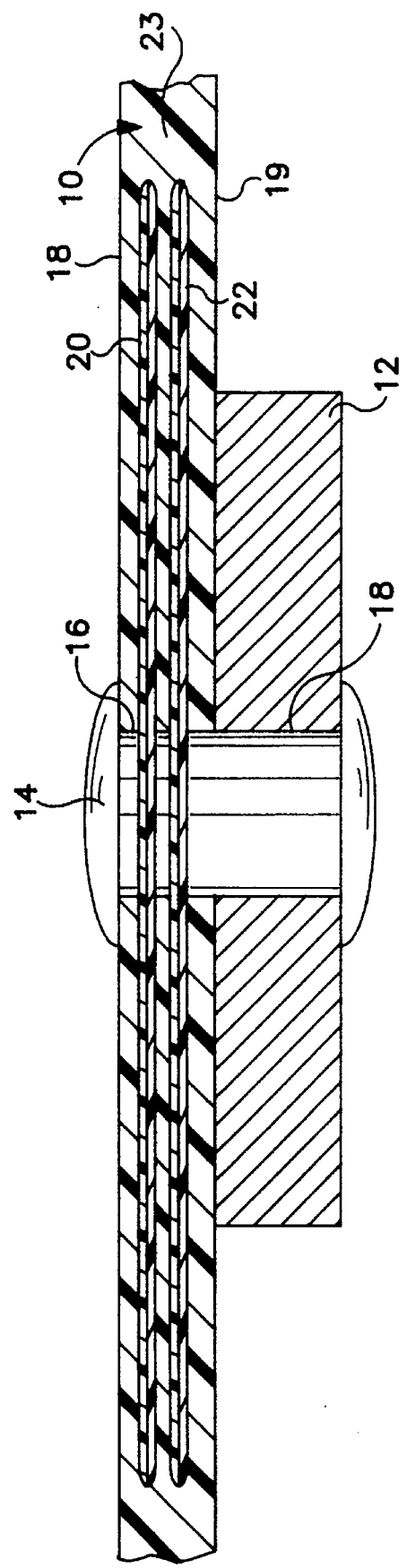
FIG. 1 is a side view partially in cross-section showing a panel or other structural element reinforced with a fiber mat, the panel being riveted to another structural element.

Referring now to FIG. 1, there is shown an assembly comprising a first structural element 10, which is configured in accordance with the principles of the present invention and a second structural element 12 to which the first structural element 10 is secured by a rivet, or other fastening member 14, extending through a through hole 16 in the first structural element and a through hole 18 in the second structural element. The structural element 10 may for example be a composite panel which may be made of a resin material which is either generally reinforced or not reinforced depending on the use to which the panel is put. For the purposes of this discussion, the structural element 10 is configured as a composite panel 10 having a first surface 18 and a second surface 19 with a first fiber reinforcement mat 20 proximate the first surface 18 and a second fiber reinforcement mat 22 proximate the second surface 19. The component panel 10 is preferably molded, extruded or otherwise configured of a resin-type material 23.

Figure 2:
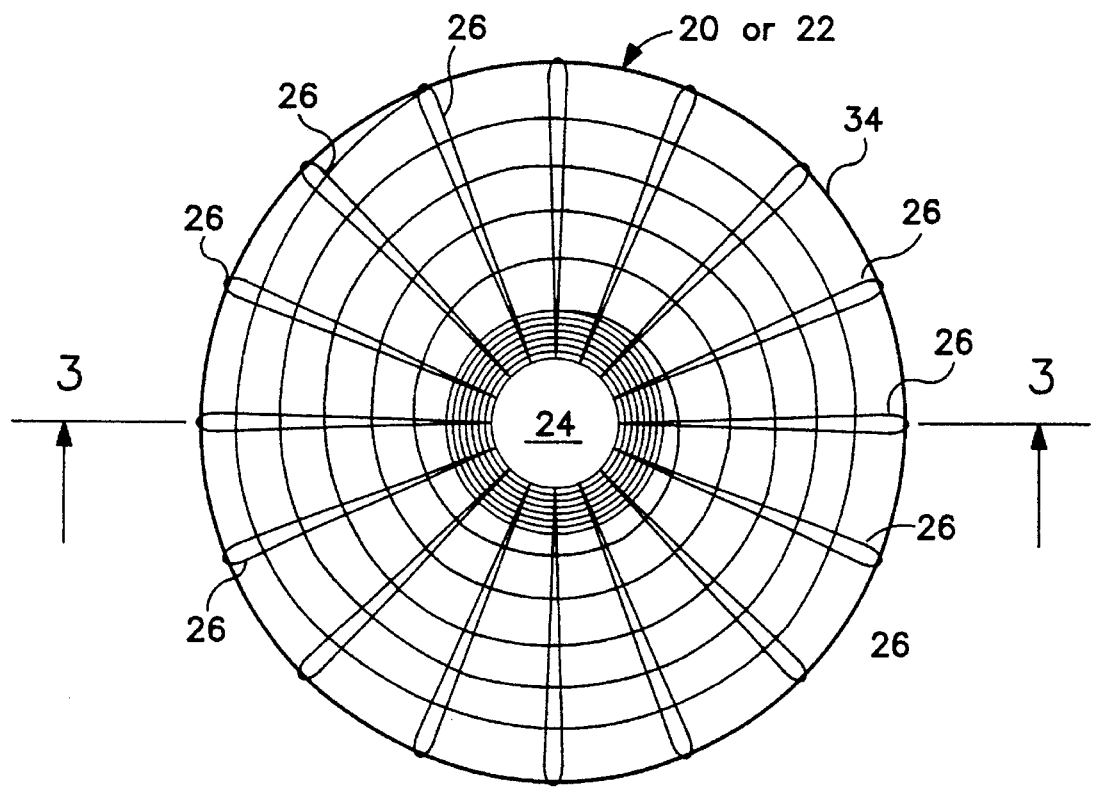
FIG. 2 is a top view of a fiber reinforcing structure utilized within a structural element of FIG. 1.

Referring now to FIG. 2, there is shown one of the fiber reinforcing mats 20 or 22, both of which mats have substantially the same general configuration. The reinforcing mat 20 or 22 has a central opening 24 through which a rivet, bolt or other fastening means extends when the mat is incorporated into a composite structure such as the panel 10 of FIG. 1.

Extending radially from the central opening 24 are a series of spaced radially disposed loops 26 which extend 360° around the opening 24. The loops 26 may be formed of a single strand of reinforcing fiber 28 or may be configured of separate strands arranged in loops. A preferable arrangement is to have a single strand. This single strand of fiber forms a warp of the woven fiber mat 20 or 22. The single strand 28 or multiple strands forming the loops 28 may be either a monofilament or a polyfilament strand.

Figure 3:
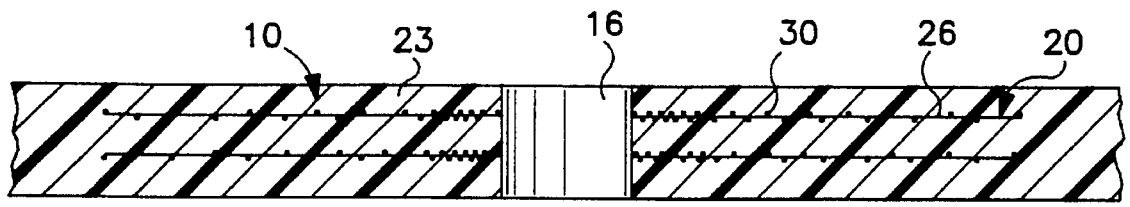
FIG. 3 is an elevational view taken along lines 3—3 of FIG. 2.

Woven through the warp formed by the loops 26 is a weft 30. The weft 30 is a single monofilament or polyfilament strand of material which, as is seen in FIG. 3, goes over one leg, a loop 26 and beneath the next leg of the loop second length in alternating fashion around the entire array of loops. As is also evident from FIG. 2 and FIG. 3, the weft 30 is woven as spiral which is tightly woven proximate the center hole 24 and progressively less tightly woven as the spiral progresses toward the periphery 34 of the mat 20 or 22.

By having the spiral formed of the weft 30 more tightly woven near the central hole 24, more reinforcing material is utilized proximate the hole which makes the composite panel 10 into which the fiber reinforcing mat is inserted much stronger. This is because the hole 24 is coaxial with the through hole 16 in the panel 10 where higher stress is applied upon applying force to the panel. As the distance from the opening 24 decreases, it is desirable to place the turns of the weft 30 further and further apart so that there is a gradual reduction in fiber density allowing stress at the through hole 16 and the panel 10 and the hole 24 to dissipate gradually in the panel out to the periphery 34 of the fiber mat 20 or 22.

By having the above described spiral reinforcement arrangement, abrupt discontinuities in the strength of the composite panel 10 are minimized resulting in a panel which is less likely to experience cracks due to impacts and fatigue. Stiffness of the panel 10 progressively decreases in radial directions away from the hole 24 providing a structural member which can be both strong and flexible. This structure, which facilitates gradual dissipation of stress, also provides panels (or other structural elements) which can be both lighter and less expensive to manufacture.

Referring particularly to the configuration of FIG. 3, it is seen that first and second fiber reinforcing mats 20 and 22 are used, however, in some applications, only a single fiber mat may be used and in other applications more than two fiber mats may be used. In a number of applications, it is preferable to dispose the fiber mats 20 and 22 near opposed surfaces 18 and 19 of the panel 10 because it is at the surface of panels that panels tend to initially crack due to fatigue and impact. After these cracks form, they propagate both radially from the source of stress and axially from the source of stress in the direction of the thickness of the panel.

The warp fiber 28 and weft fiber 30 may be of the same material or different materials. The materials may be high strength materials such as carbon fiber material or may be, for example, glass fibers or perhaps high strength resin fibers. The particular fiber chosen depends on the application to which the panel or structural member is put. The material of which the panel 10 is made is in all likelihood resin material which is configured to whatever shape the panel is to assume. The panel 10 may be configured by resin-transfer molding, by injection-compression processes or any other process. In the automotive industry, the panel 10 exemplary of structural elements which are particularly useful in eliminating steel reinforcement pads and panels for high strength applications such as seat belt anchors, engine mounts and seat attachments.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A fiber mat for reinforcing a structural member proximate a location of high stress, the improvement comprising:

a central opening through the fiber mat;

a warp material projecting radially from the central opening; and weft material woven through the warp material at a higher circumferential concentration and radially closer together proximate the central opening than distant from the central opening to provide a gradual reduction in density of weft material in the radial direction away from the central opening.

2. The improvement of claim 1, wherein the weft material is a single strand disposed in spiral form woven into the warp of material.

3. The improvement of claim 1, wherein the warp material is a single strand configured as a plurality of spaced radially extending loops extending radially from the central opening.

4. The improvement of claim 3, wherein the weft material is a single strand which is woven through the single strand of warp material forming the radially extending loops.

\* \* \* \* \*